United States Patent [19]
Dunstan
[11] Patent Number: 4,462,514
[45] Date of Patent: Jul. 31, 1984

[54] ACCELERATING AND DECELERATING WALKWAY HANDRAIL

[75] Inventor: Phillip E. Dunstan, Seattle, Wash.
[73] Assignee: The Boeing Company, Seattle, Wash.

[21] Appl. No.: 321,401
[22] Filed: Nov. 16, 1981
[51] Int. Cl.[3] ............................................. B65G 17/00
[52] U.S. Cl. .................................... 198/334; 198/335
[58] Field of Search ........................ 198/334, 335, 792; 104/25

[56] References Cited

U.S. PATENT DOCUMENTS

| | | | |
|---|---|---|---|
| 3,516,363 | 1/1968 | Van der Wal | 104/25 |
| 3,709,150 | 1/1973 | Colombot | 104/25 |
| 3,714,902 | 2/1973 | Zuppiger | 104/25 |
| 3,796,161 | 3/1974 | Colombot | 104/25 |
| 3,799,060 | 3/1974 | Johnson | 198/335 |
| 3,842,961 | 10/1974 | Burson | 104/25 |
| 3,871,303 | 3/1975 | Woodling | 104/25 |
| 3,884,152 | 5/1975 | Emeriat | 104/25 |
| 3,899,067 | 8/1975 | Kondo et al. | 198/16 |
| 3,908,811 | 9/1975 | Cortese et al. | 198/16 |
| 4,053,044 | 10/1977 | Patin | 198/334 |
| 4,066,161 | 1/1978 | Michalon et al. | 198/334 |
| 4,240,537 | 12/1980 | Dunstan | 198/792 |
| 4,284,191 | 8/1981 | Lavau | 198/334 |
| 4,908,811 | 9/1975 | Cortese et al. | 198/16 |

FOREIGN PATENT DOCUMENTS

| | | | |
|---|---|---|---|
| 2343425 | 3/1975 | Fed. Rep. of Germany | 198/792 |
| 1386449 | 3/1975 | United Kingdom . | |

*Primary Examiner*—Joseph E. Valenza
*Assistant Examiner*—Daniel Alexander
*Attorney, Agent, or Firm*—Christensen, O'Connor, Johnson & Kindness

[57] ABSTRACT

A handrail, suitable for use with an accelerating and decelerating moving walkway, comprising a plurality of overlapping handrail elements (51) movable about the periphery of a vertical, oval track, is disclosed. Handrail acceleration and deceleration is produced by changing the amount of element overlap. Element overlap is changed by an overlap control mechanism that comprises a plurality of suitably positioned cam rails (85*a* and *b*; 87*a, b, c* and *d*; 89*a, b, c* and *d*; 90*a* and *b*; and, 91) and a plurality of cam followers. The cam followers include rollers (69, 75 and 81) and arms (61, 71) that link the handrail elements (57) together. The rollers ride on the cam rails. The coaction between the rollers and the cam rails causes the arms to fold and unfold, which folding and unfolding action changes the amount of handrail element overlap. The handrail elements are moved by a cable drive mechanism that includes a main drive cable (99) that is gripped by the overlap control mechanism along substantially the entire length of constant speed zones located between the zones wherein the handrail accelerates and decelerates. In addition, preferably, the handrail elements are moved in change-of-direction regions located at the ends of the oval track by large sprockets (93) that engage selected segments of the overlap control mechanism.

1 Claim, 16 Drawing Figures

ACCELERATING AND DECELERATING WALKWAY HANDRAIL

TECHNICAL AREA

This invention is directed to handrails for moving walkways and, more particularly, to handrails suitable for use with accelerating and decelerating moving walkways.

BACKGROUND OF THE INVENTION

In the past, various types of handrails suitable for use with moving walkways have been proposed, including handrails suitable for use with accelerating and decelerating moving walkways. While useful in some environments, previously proposed moving walkway handrails designed to be used with accelerating and decelerating moving walkways have had a number of disadvantages. For example, it has been difficult to design such handrails so that their acceleration and deceleration exactly corresponds to the acceleration and deceleration of the walkway with which they are to be used. Another problem with prior art handrails, particularly those suitable for use with accelerating and decelerating moving walkways, is that they provide only very limited amounts of acceleration and deceleration—see U.S. Pat. Nos. 3,796,161, entitled "Handrails For Passenger Conveyors" and 3,842,961, entitled "Variable Speed Handrails". Other types of conveyor handrails, such as the ones described in U.S. Pat. No. 3,714,902 entitled "Conveyor Handrails" use an overlapping element approach to provide larger amounts of acceleration and deceleration. While such handrails have improved acceleration and deceleration capability, the mechanical mechanisms for creating the acceleration and deceleration by changing the amount of element overlap are not entirely satisfactory.

Additionally, it is often desired to place accelerating and decelerating moving walkways and the related accelerating and decelerating handrails in existing building corridors, such as the corridors of an aircraft terminal, without modifying the corridors. To accomplish this result, it is necessary that the vertical silhouette of the handrail be relatively low and the horizontal silhouette be relatively narrow. Frequently, prior art handrails cannot meet these requirements.

One attempt to overcome the disadvantages of prior art accelerating and decelerating handrails discussed above is described in U.S. Pat. No. 4,240,537 entitled "Accelerating and Decelerating Handrail" by Phillip E. Dunstan. While the handrail described in U.S. Pat. No. 4,240,537 overcomes many of the disadvantages of the prior art handrails noted above, it is still more complicated than desirable. Moreover, it includes a drive mechanism that creates undesirably high reaction forces through the handrail acceleration and deceleration mechanism. More specifically, the handrail described in U.S. Pat. No. 4,240,537 includes an acceleration and deceleration mechanism coupling the handrail elements together and for controlling handrail element overlap that comprises a plurality of extendable and retractable members and a plurality of curved rigid cam follower arms. The cam follower arms are pulled by drive mechanisms located along short sections of the overall handrail path of travel, rather than along a substantial portion of the handrail path of travel. Thus, relatively high reaction forces are created in the coupling and overlap control elements. Hence, while the handrail described in U.S. Pat. No. 4,240,537 is an improvement over earlier handrails, it is subject to further improvement.

SUMMARY OF THE INVENTION

In accordance with this invention, an accelerating and decelerating handrail suitable for use with an accelerating and decelerating moving walkway is provided. The handrail comprises a plurality of flexible, overlapping handrail elements movable about the periphery of a vertical, oval track. Handrail acceleration and deceleration is produced by changing the amount of element overlap. Element overlap is changed by an overlap control mechanism that comprises a plurality of suitably positioned cam rails and cam followers. The cam followers include rollers and arms that link the handrail elements together. The rollers ride on the cam rails. The coaction between the rollers and the cam rails causes the arms to fold and unfold and, thereby, change the amount of handrail element overlap. The handrail elements are moved by a cable drive mechanism that includes a main drive cable that is gripped by the overlap control mechanism over substantially the entire length of the constant speed zones located between the zones wherein the handrail accelerates and decelerates. In addition, preferably, the handrail elements are moved at the ends of the oval path of travel, where the handrail elements change direction, by large drive wheels that frictionally engage selected segments of the overlap control mechanism.

In accordance with further aspects of this invention, preferably, pairs of outer rollers are mounted on a transverse shaft, one pair for each handrail element. Rotatably mounted on each shaft are one end of each of two pairs of arms—a leading pair of arms and a trailing pair of arms. One of the arms includes an extension or short arm that is connected to a bracket affixed to the leading end of the associated handrail element. The other ends of the leading pair of arms are rotatably connected to the other end of the trailing pair of arms connected to the next adjacent handrail element in the upstream direction and the other end of the trailing pair of arms are rotatably connected to the other end of the leading pair of arms connected to the next adjacent handrail element in the downstream direction. Inner rollers are rotatably mounted on shafts located where the leading and trailing arms join. The outer rollers ride on outer cams and the inner rollers ride on inner cams. The spacing between the inner and outer cams varies in the handrail acceleration and deceleration zones to control the angle between the pairs of arms and, thus, the amount of handrail element overlap.

In accordance with yet further aspects of this invention, an over-center roller is mounted on a shaft extending between a pair of support plates, which form an integral part of the trailing arms. The over-center rollers ride on over-center cam rails located in the acceleration and deceleration zones of the handrail path-of-travel. The over-center rollers and over-center cam rails change the force vector pattern as the folding arms approach a self-locking position. The force vector pattern change reduces the handrail drive force required to change the angle between the leading and trailing pairs of arms as the self-locking position is approached. Thus, the overall amount of angular change is increased. Since the amount of angular change between the leading and trailing pairs of arms determines the amount of element overlap change and thus, the available amount of acceleration and deceleration, the over-center roller/rail mechanism increases the amount of acceleration and deceleration for a prescribed amount of handrail drive force.

In accordance with still other aspects of this invention, the plates on which the over-center rollers are mounted include jaw elements that coact with other jaw elements located on the leading pairs of arms in a manner that grips the drive cable in the constant speed zones.

As will be readily appreciated from the foregoing brief summary, the invention provides a new and improved accelerating and decelerating handrail that is relatively uncomplicated. Moreover, since the handrail elements are driven over substantially the entire length of the constant speed zones located between acceleration and deceleration zones; and, and in change-of-direction regions, reaction forces are maintained at a minimum. Thus, handrails formed in accordance with the invention are suitable for use with moving walkways that extend over relatively long distances. Further, since handrails formed in accordance with the invention occupy a minimal amount of horizontal and vertical space, they are ideally suited for use with accelerating and decelerating moving walkways mounted in existing corridors.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein.

DESCRIPTION OF THE PREFERRED EMBODIMENT

Prior to describing the preferred embodiment of an accelerating and decelerating handrail formed in accordance with the invention, a brief description of an accelerating and decelerating moving walkway with which such a handrail is useful is described. In this regard, attention is directed to U.S. Pat. No. 3,939,959 entitled "Accelerating and Decelerating Moving Walkway" by Phillip E. Dunstan et al., for a more detailed description of the type of accelerating and decelerating moving walkway hereinafter described.

Figure 1:
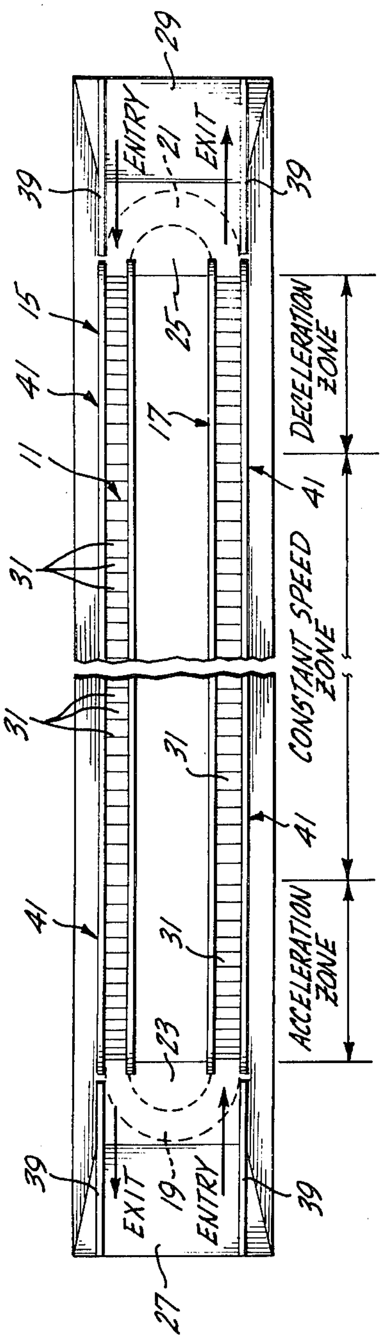
FIG. 1 is a top plan view of an accelerating and decelerating moving walkway and associated accelerating and decelerating handrails.
Figure 2:
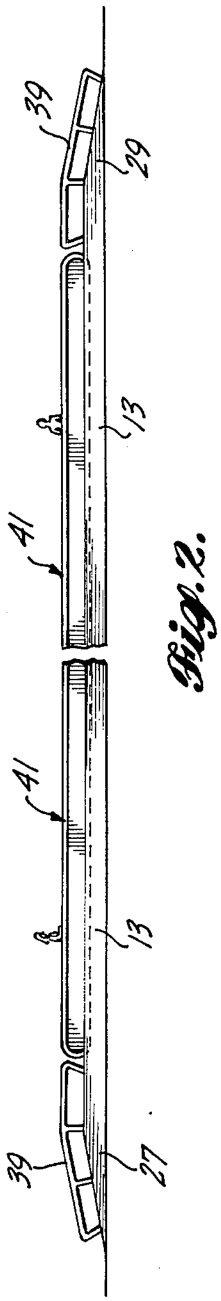
FIG. 2 is a side elevational view of the accelerating and decelerating moving walkway and handrails illustrated in FIG. 1.

An accelerating and decelerating moving walkway is illustrated in FIGS. 1 and 2 and comprises a plurality of platforms 31 that move in an oval, substantially horizontal planar track 11. The oval, substantially horizontal planar track includes two parallel runs 15 and 17 connected by curved platform turn-around regions 19 and 21. The curved platform turn-around regions 19 and 21 are covered by covers 23 and 25 that form part of a housing 13. Short ramps 27 and 29 lead up to and down from the covers 23 and 25. Each parallel run 15 and 17 is broken into three zones—an acceleration zone; a constant speed zone; and a deceleration zone. The platforms move through these zones from left to right in the lower run 17, as viewed in FIG. 1, and vice-versa (i.e., right to left) in the upper run 15, also as viewed in FIG. 1.

Each end of the moving walkway illustrated in FIGS. 1 and 2 includes an entry region and an exit region. The entry extends into the acceleration zones and the exit region extends away from the deceleration zones. Thus, people desiring to use the walkway illustrated in FIG. 1 (or freight to be transported by the walkway) enter the run 17 of the oval track illustrated in the lower portion of FIG. 1, from the left and exit from the right and vice-versa for the other run 15—as illustrated by the entry and exit arrows.

Accelerating and decelerating handrails 41, formed in accordance with this invention, are housed in balustrades located along both edges of both of the parallel runs 15 and 17 of the oval track 11. In addition, side rails 39, located on either side of the ramps 27 and 29 and the covers 23 and 25, may be included, if desired. Preferably, the side hand rails are aligned with the accelerating and decelerating handrails.

In general, each accelerating and decelerating handrail 41 includes: a plurality of overlapping handrail elements; an overlap control mechanism that controls that amount of handrail element overlap in the acceleration, constant speed and deceleration zones; and, a drive mechanism that is coupled to the handrail elements along substantially the entire length of the constant speed zones and, preferably, in change-of-direction regions located at the ends of an oval path-of-travel along which the handrail elements are moved. More specifically, the handrail elements are moved along a vertical, oval path of travel. The oval path of travel includes two straight runs vertically spaced from one another. The two straight runs are joined by change-of-direction regions in which the elements change their direction of movement by 180°. Of the two straight runs, only the upper run is exposed to be gripped by persons riding on the associated walkway platforms.

Figure 3:
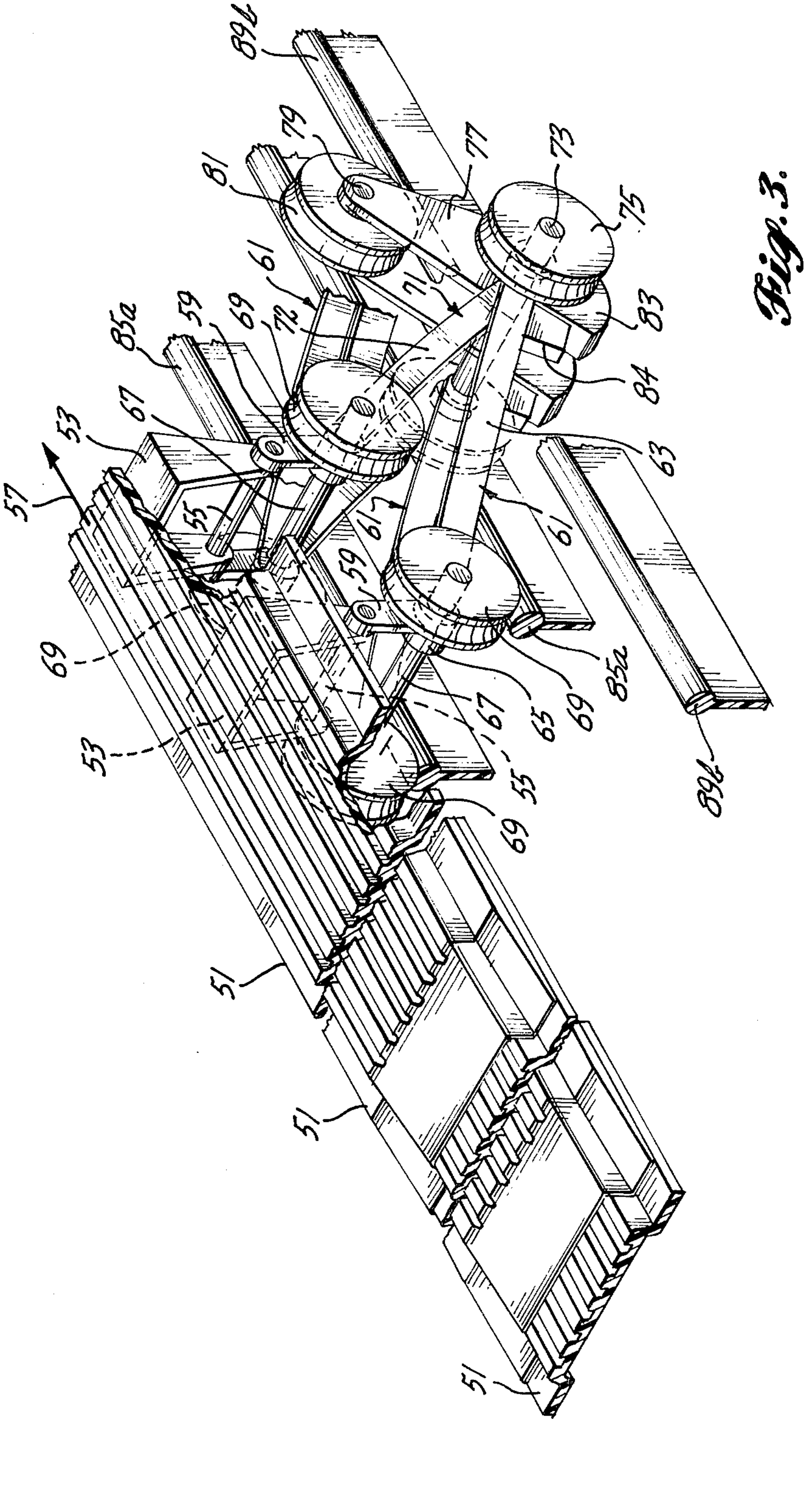
FIG. 3 is an isometric view of a portion of an accelerating and decelerating walkway handrail formed in accordance with the invention and includes overlapping handrail elements and a portion of an overlap control mechanism for controlling the amount of element overlap.

FIG. 3 illustrates parts of three of the plurality of overlapping handrail elements 51 and the portion of the overlap control mechanism that controls the amount of overlap therebetween. As shown in FIG. 3, preferably, the upper surface of the handrail elements is raised and the raised area includes a plurality of ridges whose longitudinal axes lie parallel to the direction of the travel of the handrail elements, depicted by the arrow 57. The nonraised portion of the handrail elements form a pair of outwardly projecting flanges. Further, as also illustrated in FIG. 3, preferably, the trailing end of each handrail element 51 tapers into a feather edge.

Mounted beneath the leading edge of each handrail element 51 is a U-shaped yoke 53. More specifically, the cross member of the yoke 53 is affixed to the bottom of the leading edge of the handrail element such that the arms of the yoke 53 project toward the interior of the oval path-of-travel of the handrail elements. Further, one of the arms lies on either side of the vertical center plane of the path-of-travel of the handrail elements. Located near the outer end of each arm is a hole. An attachment shaft 55 is mounted in the holes, which are aligned with one another. Due to the orientation of the arms, the attachment shafts 55 lie orthogonal to the path of travel of the handrail elements 53. The outer ends of the attachment shafts 55 extend beyond the outer faces of the arms of the U-shaped yokes 53.

Rotatably mounted on the outwardly extending ends of each attachment shaft 55 are a leading pair of arms 61. More specifically, each of the leading arms 61 is L-shaped and includes a short leg 59 and a long leg 63. The angle between the short and long legs 59 and 63 is slightly greater than 90°, as best seen in FIG. 5A–E. The outer ends of the short legs of a pair of leading arms are rotatably mounted on the outwardly extending ends of each attachment shaft 55. Thus, a pair of aligned leading arms 61 are mounted on each attachment shaft 55. The leading arms are oriented such that the short legs extend away from the related handrail elements toward the interior of the oval path-of-travel of the handrail elements. The leading arms are also oriented such that the long legs 63 project away from the path-of-travel of the handrail elements, and in the direction of movement of the handrail elments 51. In addition, the long legs 63 are not straight. Rather, they curve inwardly, away from the handrail path-of-travel when facing in the direction of movement of the handrail elements. The leading arms 61 also include a hub 65 located where the short and long arms 59 and 63 join.

An outer roller shaft 67 extends through transversely aligned holes formed in the hubs of each aligned pair of leading arms. The outer roller shafts extend beyond the outer faces of the hubs. Rotatably mounted on the outer roller shafts 67 are a pair of outer rollers 69—one outer roller being mounted on each end. Also mounted on the outer roller shafts 67 are a pair of trailing arms 71. More specifically, each of the trailing arms 71 is L-shaped and includes a long leg 72 and an integral over-center plate 77. The angle between the long leg 72 and the plate 77 is approximately 90°, as best seen in FIGS. 5A–E. The outer end of each of the long legs of the pairs of trailing arms is mounted on an associated outer roller shaft. The trailing arms are positioned such that one of each pair lies adjacent to the inner face of one of the hubs of the leading arms mounted on the common outer roller shaft. Thus the arm forming each pair of trailing arms lie on opposite sides of the center vertical plane of the path-of-travel of the handrail elements. Further, the trailing arms 71 curve away from the handrail elements when facing in the upstream direction of travel of the handrail elements. Thus, four arms, a pair of leading arms and a pair of trailing arms are mounted on each outer roller shaft 67.

The outer end of the long leg 63 of each trailing arm 61 is rotatably connected to the aligned trailing arm 71 attached to the immediately proceeding handrail element. The rotatable connection occurs at the junction where the long leg 72 and the over-center integral plate 77 meet. The rotatable connection is via a stub shaft 73.

The stub shafts 73 extend outwardly from the point of connection between the leading and trailing arms that they join. Mounted on the outwardly extending ends of the stub shafts 73 are inner rollers 75. The over-center plates 77 are generally triangular in shape and include arms that converge into a tip that lies generally upstream of the trailing arm 73 of which they are an integral part. Over-center shafts 79 extend between pairs of adjacent plates, near the tips. Rotatably mounted on the overcenter shafts 79 are over-center rollers 81.

Formed in (or mounted on) the outer surfaces of the plates 77 so as to lie beneath the long leg 63 of the leading arm 61 lying immediately downstream of each plate is a first jaw element 83. Formed in the trailing edge of each long leg 63, so as to overlie the first jaw element of the related overcenter plate is a second jaw element 84. The jaw elements are aligned with one another such that they can grip a cable lying between the jaws, as hereinafter described.

Figure 4:
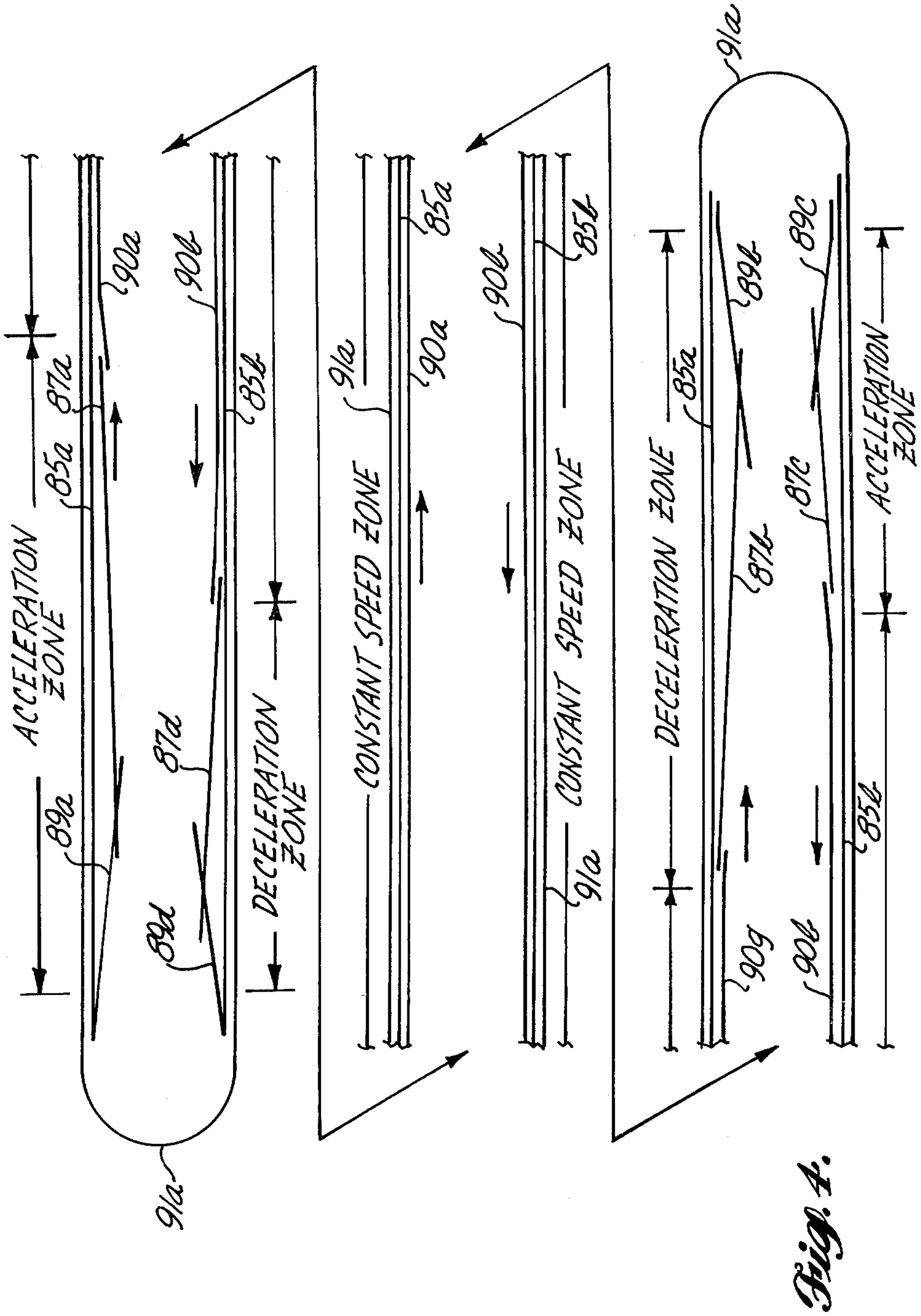
FIG. 4 is a schematic plan diagram illustrating the location of the various cam rails included in the preferred embodiment of an accelerating and decelerating handrail formed in accordance with the invention.

The outer 69, inner 75 and over-center 81 rollers of the overlap control mechanism impinge on a plurality of suitably positioned cam rails. The cam rails existing in the portion of the path-of-travel shown in FIG. 3 are partially illustrated therein. FIG. 4 is a schematic plan diagram illustrating in more detail the location of all of the cam rails on which the outer, inner and over-center rollers ride. FIG. 4 also illustrates in detail the path-of-travel of the handrail. As shown, the path-of-travel includes an upper run and a lower run joined by change-of-direction regions. Both the upper and lower runs include acceleration and deceleration zones joined by constant speed zones. Since the lower run speeds do not have to "track" the walkway speeds, as do the upper run speeds, the length of the acceleration and deceleration zones of the upper and lower runs do not have to be the same. In this regard, for purposes of illustration, the acceleration and deceleration zones of the lower run are shown in FIG. 4 as shorter than the acceleration and deceleration zones of the upper run.

The cam rails illustrated in FIG. 4 include upper and lower pairs of outer acceleration and deceleration cam rails **85*a*, *a* and 85*b*, *b*; upper and lower pairs of inner acceleration and deceleration cam rails 87*a*, *a*, 87*b*, *b*; 87*c*, *c* and 87*d*, *d*; over-center cam rails 89*a*, 89*b*, 89*c* and 89*d*; constant speed overcenter cam rails 90*a* and 90*b*; and a pair of outer lift cam rails 91*a*, *a*. The upper and lower pairs of outer acceleration and deceleration cam rails 85*a*, *a* and 85*b*, *b* lie parallel to the upper and lower runs of the path-of-travel of the handrail elements, respectively, along the entire length thereof covered by the acceleration, constant speed and deceleration zones. Sections of the upper pair of outer acceleration and deceleration cam rails 85*a*, *a* and a section of one of the deceleration over-center cam rails 89*b*, are shown in FIG. 3. As will be readily appreciated from viewing FIG. 3, the outer rollers 69 ride on the outer acceleration and deceleration cam rails (in regions where these outer cam rails are located) and the over-center rollers 81 ride on the acceleration and deceleration over-center cam rails (again in regions where these over-center cam rails are located). As will also be appreciated from viewing FIG. 3, the acceleration and deceleration outer cam rails 85***a, a* and 85*b, b* lie on opposite sides of the central vertical plane of the path-of-travel of the handrail elements and the acceleration and deceleration over-center cam rails 89*a*, 89*b*, 89*c* and 89*d* lie in the central vertical plane.

The upper pairs of inner acceleration and deceleration cam rails 87*a, a* and 87*b, b* are located in the upper acceleration and deceleration zones respectively. In these zones, the upper pairs of inner acceleration and deceleration cam rails 87*a, a* and 87*b, b* are vertically aligned with related ones of the upper pair of outer acceleration and deceleration cam rails 85*a, a*. Similarly, the lower pairs of inner acceleration and deceleration cam rails 87*c, c* and 87*d, d* are located in the lower acceleration and deceleration zones respectively. In these zones the lower pairs of inner acceleration and deceleration cam rails 87*c, c* and 87*d, d* are vertically aligned with related ones of the lower pair of outer acceleration and deceleration cam rails 85*b, b*. Further, of course, the pairs of inner acceleration and deceleration cam rails 87*a, a* 87*b, b*, 87*c, c* and 87*d, d* lie inwardly (relative to the periphery of the oval path-of-travel) of the pairs of outer acceleration and deceleration cam rails 85*a, a* and 85*b, b*. As shown in FIG. 4, the pairs of inner acceleration cam rails 87*a, a* and 87*c, c* begin at predetermined points in the acceleration zones and extend to the beginning of the constant speed zones. The pairs of inner deceleration cam rails 87*b, b* and 87*d, d* begin at the end of the constant speed zones and end at predetermined points in the deceleration zones. In the acceleration zones, the inner acceleration cam rails converge toward their acceleration zones, the inner acceleration cam rails converge toward their aligned outer acceleration and deceleration cam rails. Contrariwise, in the deceleration zones, the inner deceleration cam rails diverge away from the outer acceleration and deceleration cam rails.

The acceleration and deceleration over-center cam rails 89*a, b, c* and *d* are located at the beginning of the acceleration zones and the ends of the deceleration zones. Further, the acceleration and deceleration over-center cam rails overlap a portion of the region of the pairs of inner acceleration and deceleration cam rails that extend into the acceleration and deceleration zones in which particular acceleration and deceleration over-center cam rails lie. More specifically, one acceleration over-center cam rail 89*a* starts just before the beginning of the upper acceleration zone, extends into the upper acceleration zone and ends beyond the point where the upper pair of inner acceleration cam rails 87*a, a* begin. One deceleration over-center cam rail 89*b* begins in the upper deceleration zone at a point before the upper pair of inner deceleration cam rails 87*b, b* end, extends through the remainder of the upper deceleration zone and ends just beyond the end of the upper deceleration zone. The second acceleration over-center cam rail 89*c* starts just before the beginning of the lower acceleration zone extends into the lower acceleration zone and ends beyond the point where the lower pair of inner acceleration cam rails 87*c, c* begin. The second deceleration over-center cam rail 89*d* begins in the lower deceleration zone at a point before the lower pair of inner deceleration cam rails 87*d, d* end, extends through the remainder of the lower deceleration zone and ends just beyond the end of the lower deceleration zone. The acceleration over-center cam rails diverge from the path-of-travel of the handrail elements in the acceleration zones and the deceleration over-center cam rails converge toward the path-of-travel of the handrail elements in the deceleration zones.

The constant speed over-center cam rails 90*a* and 90*b* lie inwardly of the outer acceleration and deceleration cam rails 85*a, a* and 85*b, b* along the entire length of the constant speed zones. Further, the constant speed over-center cam rails 90*a* and 90*b* extend a short distance into the acceleration and deceleration zones. In the acceleration zones, the constant speed over-center cam rails converge toward the path-of-travel of the handrail elements and in thedeceleration zones the constant speed over-center cam rails diverge from the path-of-travel of the handrail elements. The pair of outer lift cam rails 91*a, a* circumscribe the oval path-of-travel of the handrail elements. Further, the pair of outer lift cam rail elements 91*a, a* lie outwardly of the pairs of outer acceleration and deceleration cam rail elements 85*a, a* and 85*b, b* as illustrated in FIG. 4. Also, the pair of outer lift cam rails 91*a, a* are vertically aligned with related ones of the upper and lower pairs of outer acceleration and deceleration cam rails 85*a, a* and 85*b, b*.

FIGS. 5A–E are a series of views illustrating the operation of the overlap control mechanism as the handrail elements move from a constant speed zone, through a deceleration zone, to a change of direction region. The plane of these views is the center vertical plane of the path-of-travel of the handrail elements. Thus, only one "side" of what is essentially a balanced double-sided mechanism is shown.

Figures 5A, 5B:
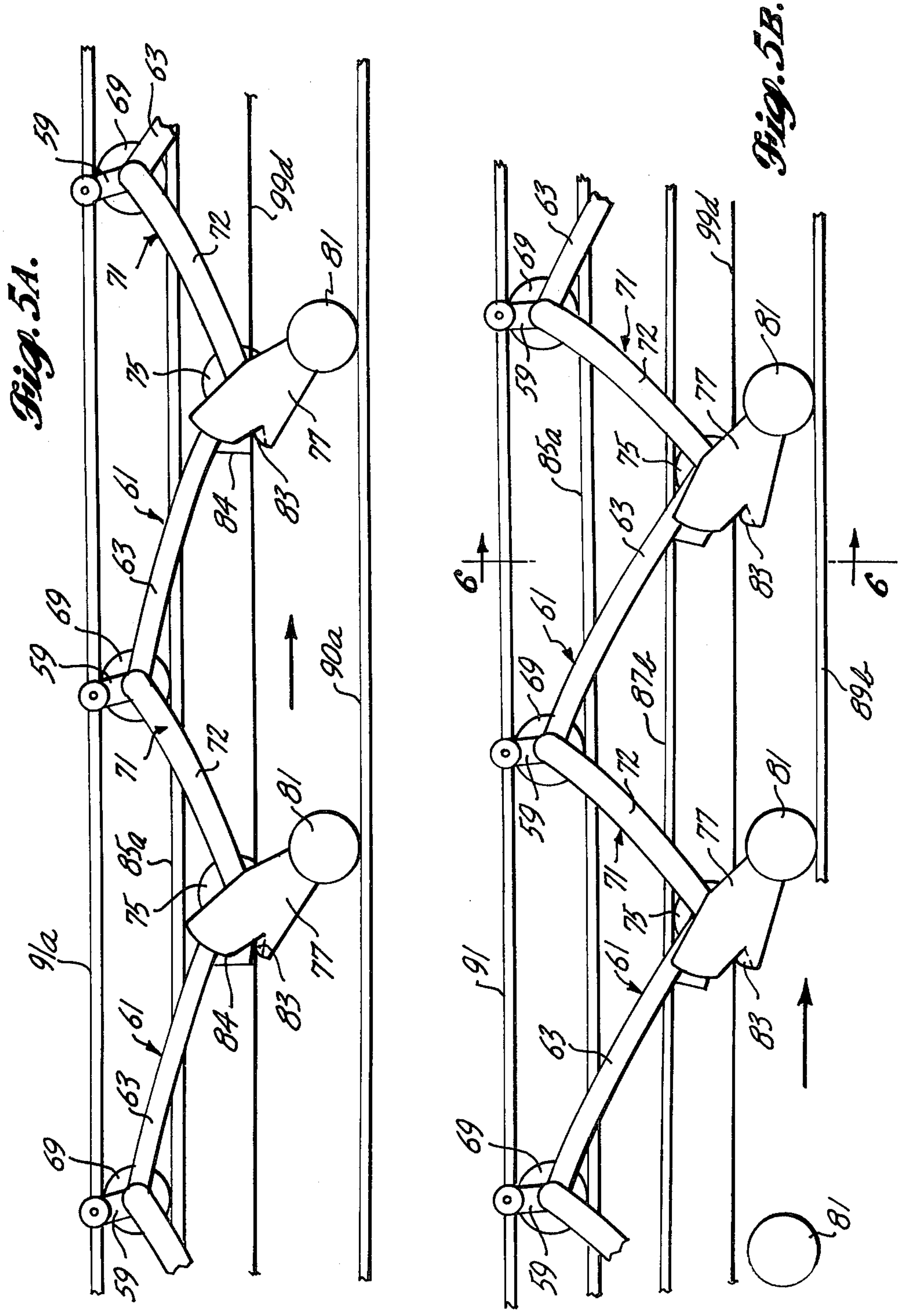
FIGS. 5A–E illustrate the overlap control mechanism forming a part of the preferred embodiment of an accelerating and decelerating handrail formed in accordance with the invention.
Figure 5C:
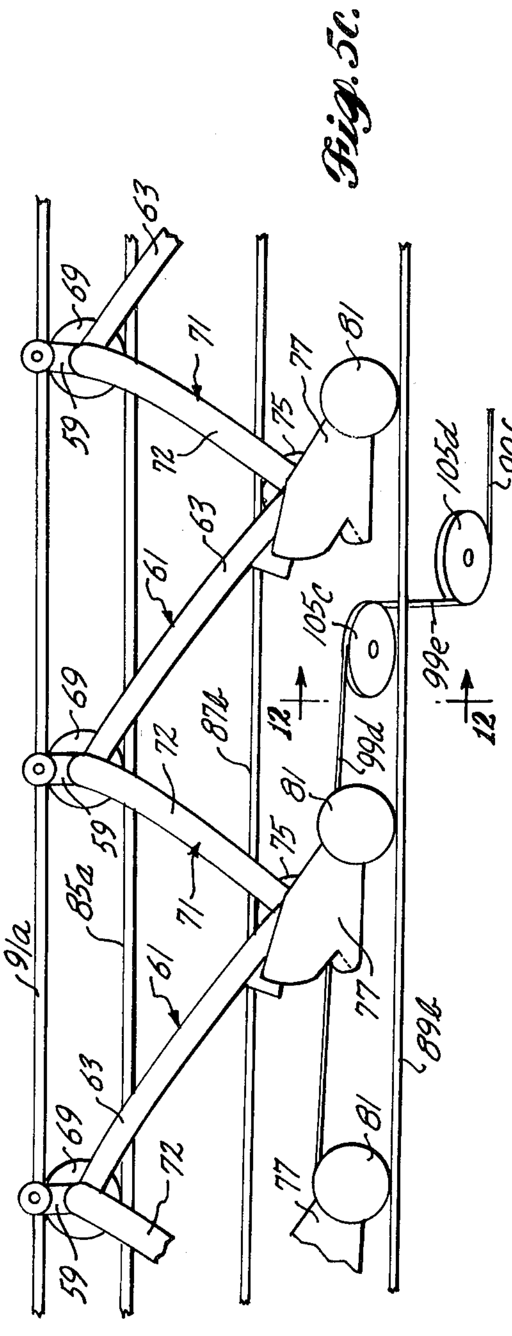
Figure 5D:
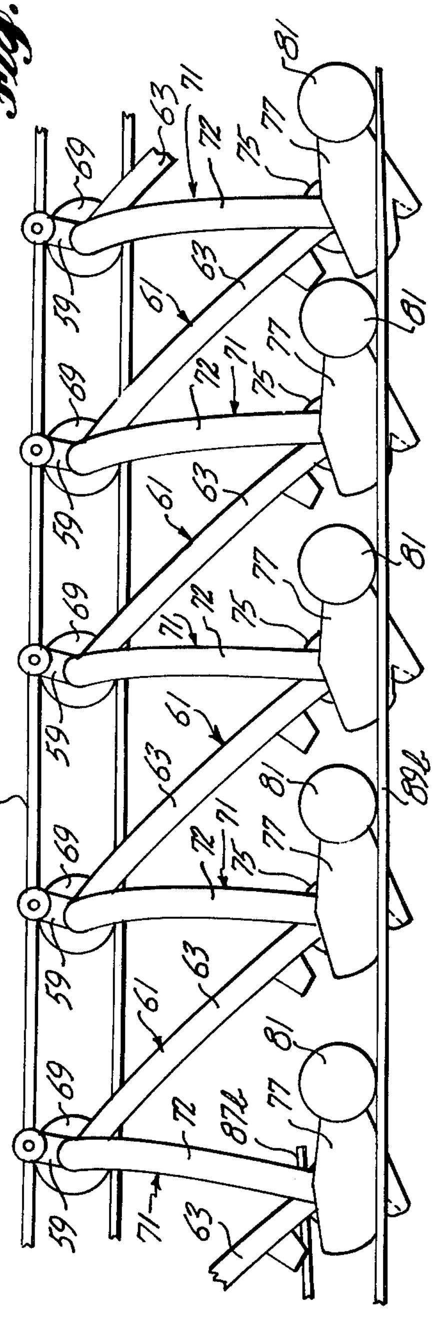
Figure 5E:
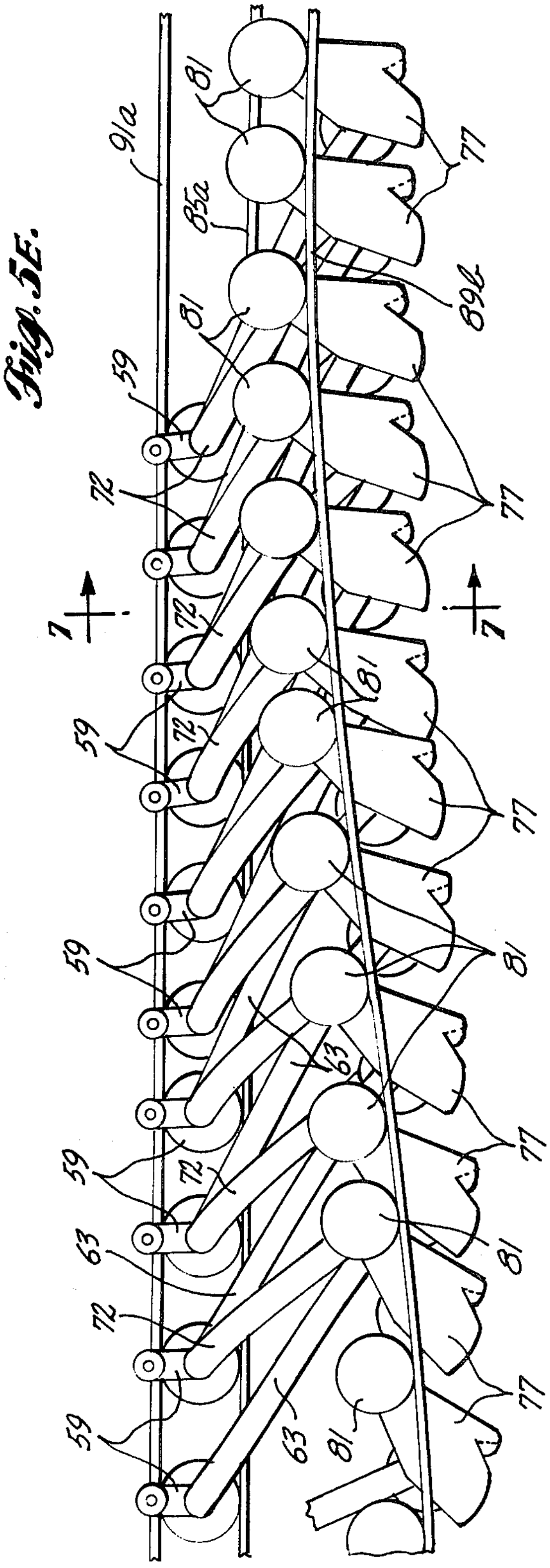
Figure 7:
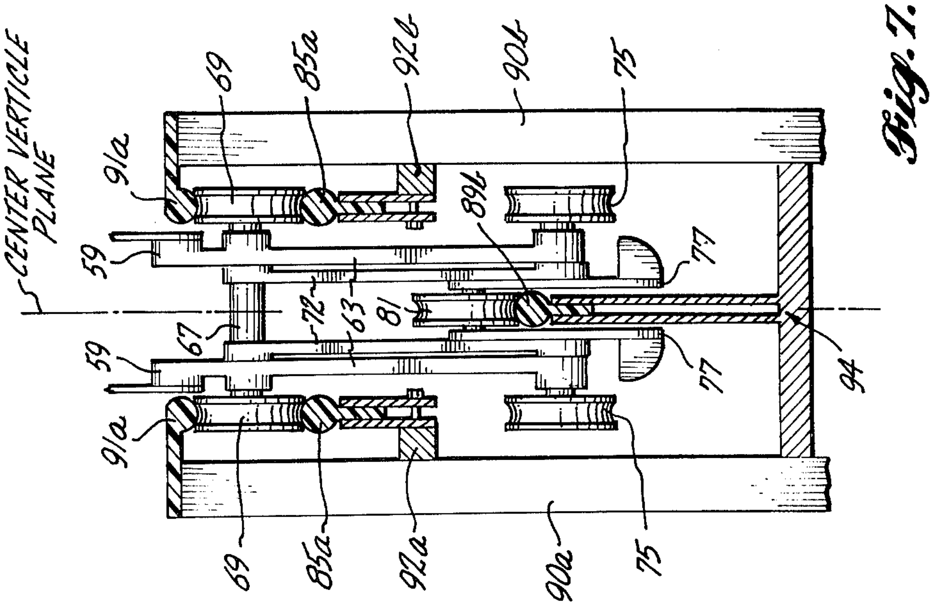
FIG. 7 is a cross-sectional view along line 7—7 of FIG. 5E.
Figure 6:
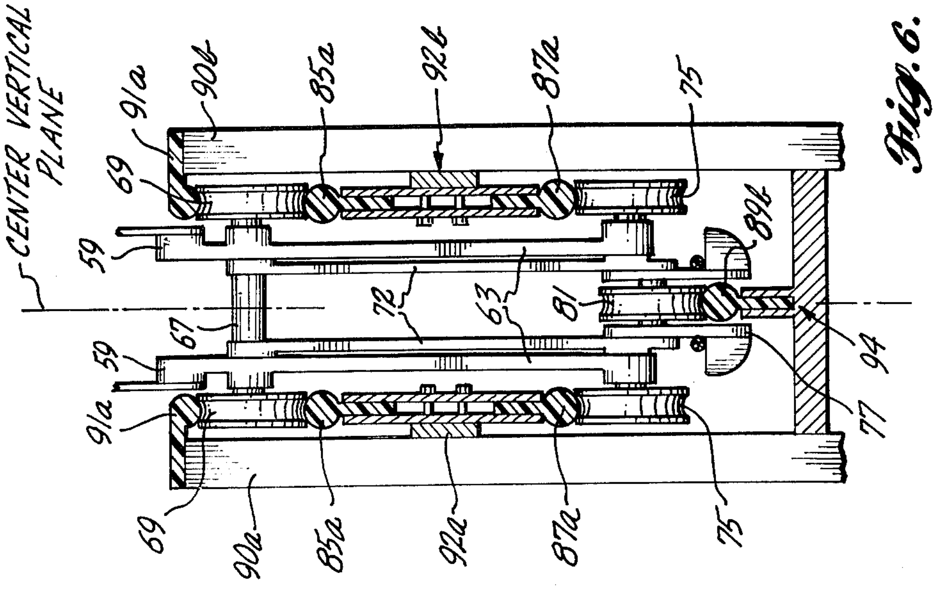
FIG. 6 is a cross-sectional view along line 6—6 of FIG. 5B.

FIG. 5A illustrates the position of the cam rails, the rollers and the other elements of the overlap control mechanism in the upper constant speed zone. FIG. 5B illustrates the position of the same elements of the overlap control mechanism at the point where the over-center cam rail 89*b* located in the upper deceleration zone begins. FIGS. 5C and 5D sequentially illustrate the position of the same elements of the overlap control mechanism at downstream points in the upper deceleration zone. FIG. 5E illustrates the position of the same elements of the overlap control mechanism at the end of the upper deceleration zone, just before the handrail elements enter the change-of-direction region. FIG. 6 is a cross-sectional view taken along line 6—6 for FIG. 5D; and, FIG. 7 is a cross-sectional view taken along line 7—7 of FIG. 5E. While, for purposes of clarity of illustration, neither the balustrade (which encloses the handrail elements, the overlap control mechanism, the cable drive mechanism and the related support structures) nor required support structures are illustrated in FIGS. 5A–5E, selected portions of the balustrade and support structures are illustrated in FIGS. 6 and 7.

As shown in FIG. 5A, when the handrail elements are in the constant speed zone, the speed of the handrail is relatively high due to the angles between the long leg 63 of the leading arms 61 and the long leg 72 of the trailing arms 71 being relatively large obtuse angles. The large angles create a small amount of element overlap and, thus, a relatively high speed of handrail movement. The pairs of outer lift cam rails 91*a* are provided to prevent a user from lifting the handrail elements. The constant speed over-center cam rail 90*a* is provided to create a force that ensures that a main drive cable is gripped in the manner hereinafter described.

As shown in FIG. 5B, the angles between the long legs 63 of the leading arms 61 and the long legs 72 of the trailing arms 71 decreases in the deceleration zones as the upper pair of inner deceleration cam rails 87*b, b* diverge from the upper pair of outer acceleration and deceleration cam rails 85*a, a.* More specifically, as the upper pair of inner deceleration cam rails 85*b, b* diverge from the upper pair of outer acceleration and deceleration cam rails 85*a, a,* the inner rollers 75 are forced to move away from the outer rollers 69 whereby the angles between the long legs 63 of the leading arms 61 and the long legs 72 of the trailing arms 71 decreases. As a result, the amount of overlap between adjacent handrail elements increases. As the amount of element overlap increases, the relative speed of the handrail decreases.

FIG. 5B also illustrates (as noted above) that a deceleration over-center cam rail 89*b* begins at a predetermined point in the upper deceleration zone. At the beginning point (or slightly downstream), the over-center rollers begin to ride on the deceleration over-center cam rail. At this point such impingement has little effect, except to ensure the hereinafter described disengagement of the main drive cable.

As illustrated in FIG. 5C and previously noted, in the upper deceleration zone, the upper pair of inner deceleration cam rails 87*b, b* continue to diverge away from the upper pair of outer acceleration and deceleration cams rails 85*a, a.* As a result, the angles between the long legs 63 of the leading arms 61 and the long legs 72 of the trailing arms 71 continue to decrease, passing through 90° and becoming acute.

As shown in FIGS. 4 and 5D, at the appropriate point in the upper deceleration zone, the upper pair of inner deceleration cam rails 87*b, b* terminate. As previously noted, the pair of outer lift cam rails 91*a, a* overlies the upper pair of outer acceleration and deceleration cam rails 85*a, a.* The pair of outer lift cam rails 91*a, a* are spaced from the upper pair of outer acceleration and deceleration cam rails 85*a, a* by a distance equal to the diameter of the outer rollers 69. The pair of outer lift cam rails 91*a, a* counteract the lift force produced when the over-center roller 81 acts to continue the folding action that occurs between the leading and trailing arms as the handrail is decelerated. More specifically, as the angles between the long legs 63 of the leading arms 61 and the long legs 72 of the trailing arms 71 becomes more and more acute, the trailing arms approach the point where they are vertically aligned with the outer roller 69 to which they are rotatably attached.

As will be readily appreciated by those skilled in this art, in the absence of other factors, such as friction, as vertical alignment is approached, the force transmitted along the longitudinal axis of the trailing arms 71 approaches a point where it lies orthogonal to the axis of the outer acceleration and deceleration cam rails 85*a, a.* As the orthogonal position is approached, the force vector orthogonal to the direction of movement approaches infinity as the force vector in the direction of movement approaches zero. In practice this results in the mechanism reaching a self-locking position at the point where the friction of the rollers equals the small force in the direction of motion. More specifically, the force transferred through the folding arms can be broken into a vector lying parallel to the direction of movement and a vector lying orthogonal to the direction of movement. As the arms fold, the direction of movement force vector decreases and the orthogonal force vector increases. As the trailing arm approaches an orthogonal position, the direction of movement vector approaches zero. For a predetermined amount of applied force, the mechanism becomes self-locking when friction equals the direction of movement force vector. At this point, if folding is to continue a larger and larger total force must be applied. The over-center roller/cam rail mechanism of the accelerating and decelerating walkway of the invention avoids this problem by modifying the force vector pattern in a manner that reduces the orthogonal force vector and increases the direction of movement force vector. Specifically, just before the trailing arms 71 reach a vertical position, the upper pair of inner deceleration cam rails 87*a, a* end. At this point, the over-center rollers 81, as shown in FIG. 5D, lie upstream of the outer rollers 69. As a result, the folding force axis is transferred from a downstream direction (between the outer and inner rollers) to an upstream direction (between the outer and over-center rollers), without the force axis ever becoming orthogonal to the related cam rails. As previously discussed, the deceleration over-center rail 89*b* converges in the direction the upper pair of outer cam rails 85. As a result, the angle between the long leg 63 of the leading arm 61 and the trailing arm 71 continues to decrease.

In summary, the outer roller 69 and the inner roller 75 and their related pairs of outer and inner cam rails control the initial folding action between the long legs 63 of the leading arms 61 and the long legs 72 of the trailing arms 71. When the long legs 72 of the trailing arms 71 approach an over-center position, i.e., a position whereat the inner rollers 75 are vertically aligned with the outer rollers 69, the over-center rollers 81 in combination with the over-center deceleration cam rails take over the folding action. As a result, the force requirements as the trailing arms approach the orthogonal position are significantly reduced. Moreover, because the over-center mechanism provides for continued folding action, the amount of handrail element overlap change that can be achieved for a realistic amount of drive force is increased. While not described in detail, as will be readily appreciated by those skilled in this art and others from the foregoing description, the over-center mechanism acts in a reverse manner in the acceleration zones.

Figure 8:
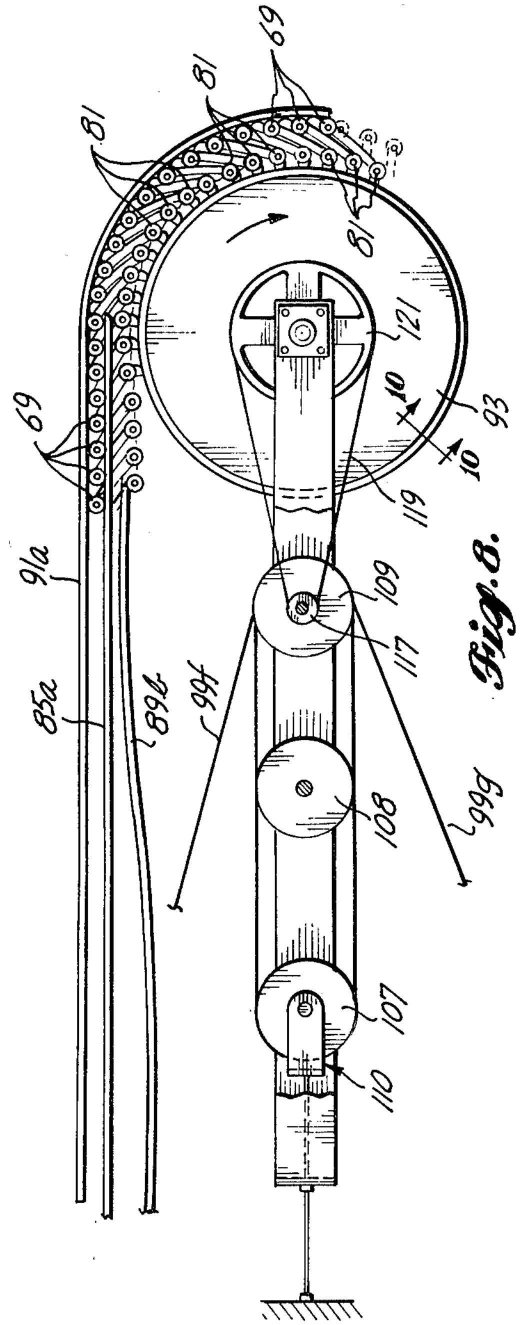
FIG. 8 is an enlarged side elevational view of the part of the drive mechanism located in the change-of-direction regions.
Figure 9:
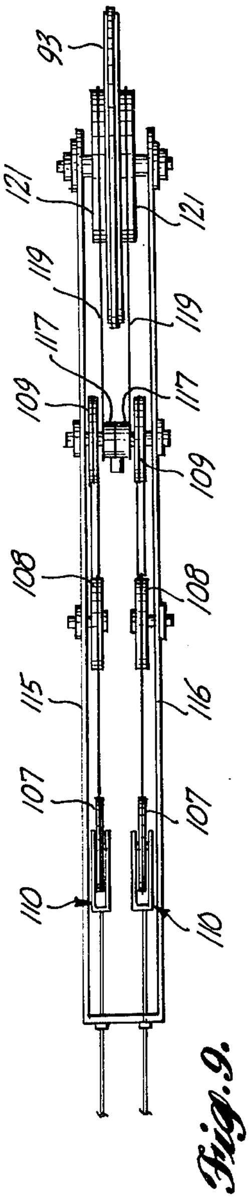
FIG. 9 is a top view of the mechanism illustrated in FIG. 8.

As shown in FIG. 5E, and noted above, in the upper deceleration zone, the over-center deceleration cam rail 89*b* continues to converge toward the upper pair of outer acceleration and deceleration cam rails 85*a, a.* As this occurs, the angles between the long legs 63 of the leading arms 61 and the long legs 72 of the trailing arms 71 (which are now pointed in a leading direction) continue to decrease. As a result, as noted above, the handrail element overlap continues to increase, whereby the relative speed of the handrail decreases. By the time the change-of-direction region is reached, both the adjacent outer rollers and adjacent the over-center rollers are closely spaced. The mechanism for moving the handrail elements through the change-of-direction region is illustrated in FIGS. 8 and 9, and described below.

As noted above, in order to avoid unduly complicating the drawing, the balustrade that encloses the overlap control mechanism and the cable drive mechanism are not included in FIGS. 5A–E. For the same reason no support structure is illustrated in these FIGURES. While not shown is these FIGURES such items would, of course, be included in an actual embodiment of the invention. By way of example only FIGS. 6 and 7 include selected parts of such items. More specifically, FIGS. 6 and 7 illustrate a balustrade or enclosure that includes a pair of spaced apart vertical walls 90*a* and 90*b*. The walls may be formed of frames and stringers built with conventional reinforcing elements, such as metal channels, T-section, L-sections, etc., covered by panels of sheet metal, for example. The overlap control mechanism and the cable drive mechanism are located between the spaced apart walls 90*a* and 90*b*. Suitable support structures 92*a* and 92*b* attached to the inside faces of the walls 90*a* and 90*b* support the aligned upper pairs of outer and inner cam rails 85*a, a* and 87*b, b*. A lower support structure 94, attached to both of the walls 90*a* and 90*b* supports the over-center cam rail 89*b*. Finally, the pair of end cam rails 91*a, a* are supported by arms mounted atop (or in some other manner attached to) the walls 90*a* and 90*b*. (The handrail elements 51 lie above the top of the walls 90*a* and 90*b*).

Turning now to the mechanism for moving the handrail elements through the change-of-direction regions; located at each end of the oval path-of-travel of the handrail elements is a relatively large drive wheel 93 (FIGS. 8–10), which are rotated by the hereinafter described cable drive mechanism. The plane of the drive wheels 93 is vertical and coincident with the vertical center plane of the path-of-travel of the handrail elements. The pairs of outer lift cam rails 91*a, a* follow semicircular paths around the outer periphery of the drive wheels 93. The center of rotation of the drive wheels 93 is coincident with the center of the semicircular paths followed by the outer lift cam rails 91*a, a*.

Figure 10:
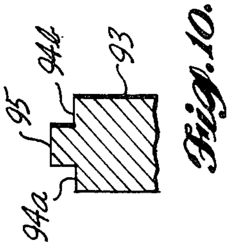
FIG. 10 is a cross-sectional view along line 10—10 of FIG. 8.

As illustrated in FIG. 10, the cross-sectional configuration of the outer edge of the drive wheels includes two shoulders 94*a* and 94*b* separated by a protrusion 95. When the drive wheel engages the overlap control mechanism in the manner hereinafter described, the protrusion 95 lies between the plates 77 of the trailing arms 71 and the shoulders 94*a* and 94*b* frictionally engage the innermost projections of the leading and trailing arms 61 and 71.

The over-center deceleration cam rail 89*b* of the overlap control mechanism located in the upper deceleration zone ends at a point tangential to the upper most peripheral point on the adjacent drive wheel 93. At this point the protrusion 95 on the drive wheel 93 enters the area between the plates 77 and the shoulders 94*a* and 94*b* frictionally engage the leading and trailing arms 61 and 71. As a result of this frictional engagement the drive wheel 93 applies a drive force to the overlap control mechanism, and, thus, creates handrail movement force in the change-of-direction regions. The leading and trailing arm inner protrusions are disengaged from the drive wheel 93 at a point tangential to the bottommost peripheral point on the drive wheel 93, where they are received by the over-center acceleration cam rail 89*c* located in the lower acceleration zone. Thereafter, the angles between the long legs 63 of the leading arms 61 and the long legs 72 of the trailing arms 73 increase, as the over-center acceleration cam rail 89*c* diverges away from the lower pair of outer acceleration and deceleration cam rails 85*b, b*. As the overlap between the handrail elements decreases, handrail acceleration occurs. After being accelerated in the lower acceleration zone, the handrail elements are moved through the lower constant speed zone, and then, decelerated in the lower deceleration zone. After being decelerated, the handrail elements pass through another change-of-direction region and are accelerated in the upper acceleration zone. Thereafter the handrail elements pass through the upper constant speed zone and, then, again enter the upper deceleration zone.

A cable drive system included in an accelerating and decelerating walkway handrail formed in accordance with the invention includes a pair of main drive cables 99 that are moved along paths-of-travel that lie between the outer rollers 69 and the inner rollers 75 in the constant speed zones. In these zones, i.e., the constant speed zones, the main drive cable is gripped by the first and second jaw elements 83 and 84 of the overlap control mechanism. In addition, the main drive cables are connected via a coupling mechanism to the drive wheels 93 so as to rotate the drive wheels. As a result, a single drive source is used to move the overlapping handrail elements of the accelerating and decelerating moving walkway of the invention in both the constant speed zones and in the change-of-direction regions.

Figure 11:
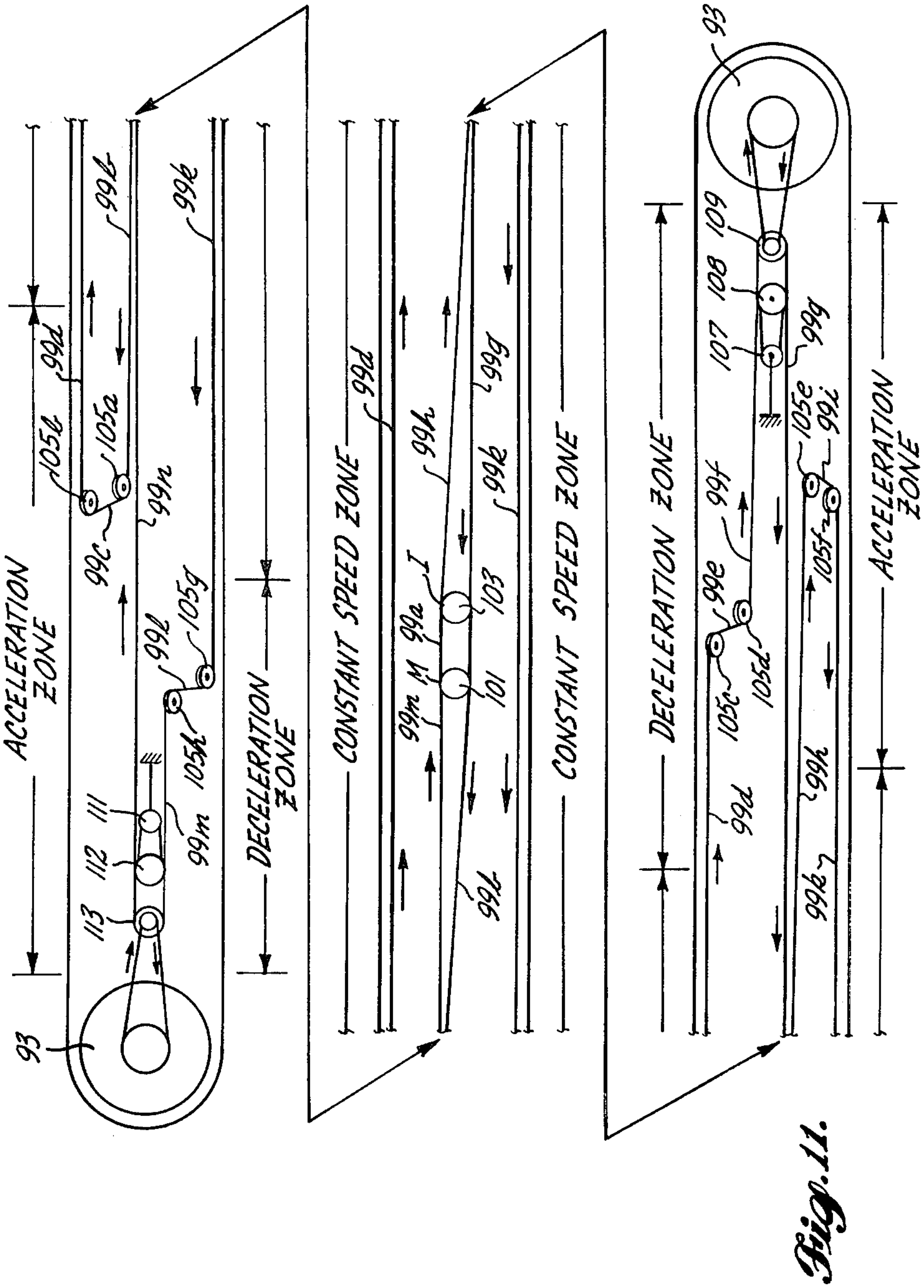
FIG. 11 is a schematic plan diagram illustrating the drive mechanism forming a part of the preferred embodiment of an accelerating and decelerating handrail formed in accordance with the invention; and, FIG. 12 is a cross-sectional view along line 12—12 of FIG. 5C.

As shown in FIG. 11, each of the main drive cables 99 is continuous and moved by a drive sheave 101, preferably, located near the center of the oval path-of-travel of the handrail elements. Also, preferably, the same motor drives both the drive sheaves (i.e., those on opposite sides of the center vertical plane of the oval path-of-travel of the handrail elements) in order to avoid synchronization problems. Spaced from the drive sheaves 101 are idler sheaves 103. Each main drive cable is looped 99*a* a few times around its associated drive and idler sheaves 101 and 103 so that an adequate frcition coupling exists between the main drive cable and the drive sheave. After leaving the loop 99*a*, each main drive cable enters a path 99*b* that terminates at a first path sheave 105*a*. The first path sheave 105*a* is located near the end of the upper acceleration zone, and inwardly thereof. In addition, the first path sheave is slightly inclined to avoid conflicts between the cable and the overlap control mechanism, which conflicts are discussed in detail with respect to the hereinafter described path sheaves located near the beginning of the upper deceleration zone. After passing around the first path sheave 105*a*, the main cable enters a short path 99*c* that terminates at a second path sheave 105*b*. The second path sheave 105*b* is also slightly inclined. The inclination is such that the "output" point on the second path sheave 105*b* lies in the plane of the path-of-travel of the related cable beneath the upper constant speed zone of the handrail elements.

After passing around the second path sheave 105*b*, the cable enters a path 99*d* that lies immediately beneath the constant speed zone of the upper path of travel of the handrail elements. In this area the cable 99 is gripped between the first and second jaw elements of the overlap control mechanism as they pass through the upper constant speed zone. More specifically, as shown in FIG. 5A, the cable 99 lies between the first jaw element 83 formed in the plates 77 the second jaw elements 84 formed by a rearwardly extending protrusion located in the trailing edge of the long legs 63 of the leading arms 61. In the constant speed zone the over-center rollers 81 impinge on the constant speed over-center cam rails 90*a* and 90*b*. This impingement creates a lift force that causes the first jaw elements 83 to press the cable 99 against the second jaw elements 84. The lift force acts against the outer lift cam rails 91*a*. As a result, the cable 99 is gripped between the jaw elements. After the handrail elements leave the constant speed zone, and move to the region where the over-center rollers 81 start to intersect the over-center deceleration cam rail 89*b* (FIG. 5B), the first jaw element is rotated away from the second jaw element. As a result, the cable gripping friction force ends. Thereafter the cable, is still supported by the first jaw elements 83, even though its no longer gripped.

The support provided by the first jaw elements continues until the cable reaches a third path sheave 105*c* (FIGS. 5C and 11). The third path sheave is located near the beginning of the upper deceleration zone. The third path sheave is inclined in the same manner as the second path sheave. The third path sheave directs the cable downwardly and outwardly away from the path-of-travel of the handrail elements, into a short path 99*e*. The short path 99*e* ends at a fourth path sheave 105*d*. The fourth path sheave is inclined in the same manner as the first path sheave and directs the cable into a path 99*f* that extends to a trio of end sheaves 107, 108 and 109 positioned inwardly of the sprocket located at the nearest end of the oval path-of-travel of the handrail elements. The trio of end sheaves are coupled to the end sprocket in the manner hereinafter described.

Figure 12:
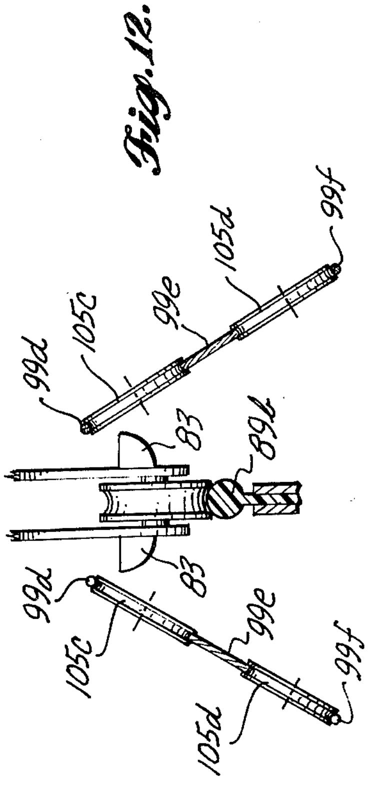

As noted above, the two pairs of path sheaves heretofor described, i.e., the first and second path sheaves 105*a* and 105*b* and the third and fourth path sheaves 105*c* and 105*d*, are inclined. The inclination is such that the drive cables are directed toward and away from their paths-of-travel beneath the constant speed zones in a manner that prevents impingement between the overlap control mechanism and the main drive cable. More specifically, as shown in FIGS. 5C and 12, the third (uppermost) path sheave 105*c* of the pair of path sheaves located beneath the upper deceleration zone directs the drive cable both outwardly and downwardly and, thus, away from the first jaw elements 83. The fourth path sheave directs the cable into path 99*f*, which path lies in a plane lying parallel to, but not spaced outwardly from the plane in which first and second jaw elements move. The first and second path sheaves function in a similar manner to direct the cable from an outer path into the inner path where the cable is gripped between the first and second jaw elements.

After making several wraps around the trio of end sheaves 107, 108 and 109, the cable enters a path 99*g* that ends at the drive and idler sheaves 101 and 103. The drive cable is again wrapped around the drive and idler sheaves 101 and 103, and, then, enters a path 99*h* that extends outwardly and downwardly until it ends at a fifth path sheave 105*e*. The fifth path sheave 105*e* is inclined and directs the cable along a short path 99*i* to a sixth path sheave 105*f*, which is also inclined. As with the first and second path sheaves 105*a* and 105*b*, the fifth and sixth path sheaves 105*e* and 105*f* direct the cable from an outer plane inwardly toward a plane in which the cable can be gripped by the first and second jaw elements as they move through the lower constant speed zone. The portion of the cable path 99*k* that is gripped by the first and second jaw elements ends at a seventh path sheave 105*g*. The seventh path sheave is inclined and directs the cable into a short path 99*l* that terminates at an eighth path sheave 105*h*. The eigth path sheave 105*h* is also inclined. As with the third and fourth path sheaves 105*c* and 105*d*, the seventh and eighth path sheaves 105*g* and 105*h* direct the cable away from the overlap control mechanism in a manner that prevents the cable from interfering with the the operation of the overlap control mechanism. From the eighth path sheave 105*h*, the cable enters a path 99*m* that ends at a second trio of end sheaves 111, 112 and 113. The second trio of end sheaves 111, 112 and 113 are coupled to the sprocket 93 located at the other end of the path-of-travel of the handrail elements in the manner hereinafter described. After making several loops around the second trio of end sheaves 111, 112 and 113, the main drive cable enters a path 99*n* that ends at the first loop 99*a* formed between the driven and idler sheaves 103.

In summary, each of the main drive cables is continuous. Further, each of main drive cables is directed inwardly and outwardly between two planes. In the inner plane the cables move along paths lying parallel to the handrail elements being moved through the constant speed zones. When moving in these planes the main drive cable is gripped by the overlap control mechanism. Hence, the handrail elements are driven along substantially the entire length of the constant speed zones. in the outer plane, the main drive cables are driven by the driven/idler sheave combination and are connected to two trios of end sheaves coupled to the sprockets located in the change-of-direction regions.

As best shown in FIG. 8, each trio of end sheaves 107, 108, and 109 about which the main drive cables are wrapped include two main sheaves 108 and 109 about which the cable makes several loops and a tension sheave 107. The trios of end sheaves are horizontally aligned in side-by-side relationship with the tension sheave being the intermost sheave. The trios of end sheaves are supported by pairs of spaced apart support plates 115 and 116. The tension sheaves 107 or 111 are mounted in a mechanism 110 that allows them to be moved toward and away from the main sheaves 108 and 109. Position adjustment of the tension sheaves 107 provides for cable tension control. In addition, the tension sheave position adjustment mechanism 110 allows the cable to be repaired without removing the entire cable by moving frayed or worn cable sections to the region between the tension and next adjacent outer sheave releasing the tension on the cable and repairing or replacing the frayed or worn section of the cable.

Mounted on the same shaft as the outer most one of the trio of outer sheaves 109 and affixed thereto are two small sprockets 117. The small sprockets 117 are connected by a toothed belt or roller chain 119 to a pair of large sprockets 121 mounted on the same shaft as the drive wheel 93. The large sprockets 121 are affixed to the drive wheel 93. As a result, when the belt or chain 119 is rotated as a result of the rotation of the outer most one of the outer sheaves 109 (which rotation is produced by movement of the main drive cable 99), the large sprockets 121 and the drive wheel 93 are rotated. In this manner, a single cable drive system drives the handrail element in the change-of-direction regions as well as the constant speed zones. The only regions in which the handrail elements are not directly driven are the acceleration and deceleration zones. Of course, the handrail elements are indirectly driven in these zones due to the coupling provided by the rigid arms of the overlap control mechanism.

As will be readily appreciated from the foregoing description, the invention comprises a new and improved accelerating and decelerating walkway handrail. Because the walkway handrail is driven over a substantial portion of the path-of-travel of the handrail, reaction forces are minimized when compared to a system wherein drive power is applied at one or only a few points. In addition, the large forces that are normally required of a mechanism having over-center movement are avoided by the over-center roller/cam rail mechanism of the invention. Further, the over-center roller/cam rail mechanism increases the amount of overlap change available, whereby the available amount of acceleration and deceleration is increased.

While a preferred embodiment of the invention has been illustrated and described, it will be appreciated that various changes can be made therein without departing from the spirit and scope of the invention. Consequently, within the scope of the appended claims, the invention can be practiced otherwise than as specifically described herein.

The embodiments of the invention in which an exclusive property or privilege is claimed are defined as follows:

1. An accelerating and decelerating walkway handrail comprising:

(A) a plurality of overlapping handrail elements; and (B) movement and control means coupled to said plurality of overlapping handrail elements for moving said handrail elements about a vertical, generally oval path of travel that includes acceleration, constant-speed and deceleration zones and for controlling the amount of handrail element overlap in said acceleration, constant-speed, and deceleration zones such that the amount of overlap decreases in said acceleration, remains constant in said constant-speed, and increases in said deceleration zones, said movement and control means comprising:

(1) overlap control means for controlling the amount of overlap between adjacent overlapping handrail elements such that said amount of overlap decreases in acceleration, remains constant in constant-speed, and increases in deceleration zones, said overlap control means including:

(a) a plurality of discrete cam rails mounted inside of said vertical, generally oval path of travel, said plurality of cam rails converging toward, lying parallel to, and diverging from said vertical, generally oval path of travel in a predetermined discontinuous manner in said acceleration and deceleration zones;

(b) a plurality of rigid arms mounted inside of said vertical, generally oval path of travel and connected together to fold and unfold, said plurality of rigid arms being connected to said plurality of overlapping handrail elements such that the folding and unfolding action of said plurality of rigid arms causes a respective decrease and increase in the amount of overlap between adjacent handrail elements, said plurality of rigid arms including a plurality of leading arms and a plurality of trailing arms, said leading arms and trailingarms being joined together in an alternating manner and positioned such that one (outer) set of alternating junctions lies outwardly from the other (inner) set of alternating junctions, said outer set of alternating junctions being connected to the leading edge of said plurality of overlapping handrail elements, said plurality of leading and trailing arms moving through an over-center position as said arms are folded, said over-center position lying between a trailing position whereat said trailing arms point downstream of the direction of movement of said plurality of handrail elements and a leading position whereat said trailing arms point upstream of the direction of movement of said handrail elements;

(c) a plurality of groups of rollers mounted on said plurality of rigid arms, said plurality of groups of rollers being positioned such that each of said groups selectively impinges a different one of said plurality of discrete cam rails, said selective impingement applying forces to said plurality of rigid arms that control said folding and unfolding action of said plurality of rigid arms; and (d) an over-center mechanism for moving said trailing arms through said over-center position, said over-center mechanism including a plurality of over-center cam rails, one of said over-center cam rails being located in each of said acceleration and deceleration zones, said over-center mechanism also including a plurality of plates and over-center rollers connected to said other set of alternating junctions, said over-center rollers being adapted to impinge on said over-center cam rails in said regions of said acceleration and deceleration zones where said over-center cam rails are located; and (2) drive means coupled to said overlap control means over substantially the entire length of said constant-speed zones for moving said plurality of rigid arms and, thus, said plurality of overlapping handrail elements about said vertical, generally oval path of travel, said drive means including a main drive cable, a plurality of path sheaves that direct said main drive cable along a path of travel that underlies said constant-speed zones and gripping means forming part of said overlap control means for gripping said main drive cable in said constant-speed zones, said gripping means comprising a first jaw element formed in the trailing edge of said leading arms and a second jaw element formed on the plates of said over-center mechanism.

* * * * *